April 13, 1948. R. FEITL ET AL 2,439,785
TOOL FOR HANDLING OPEN-ENDED RETAINING RINGS
Filed Feb. 19, 1945 2 Sheets-Sheet 1
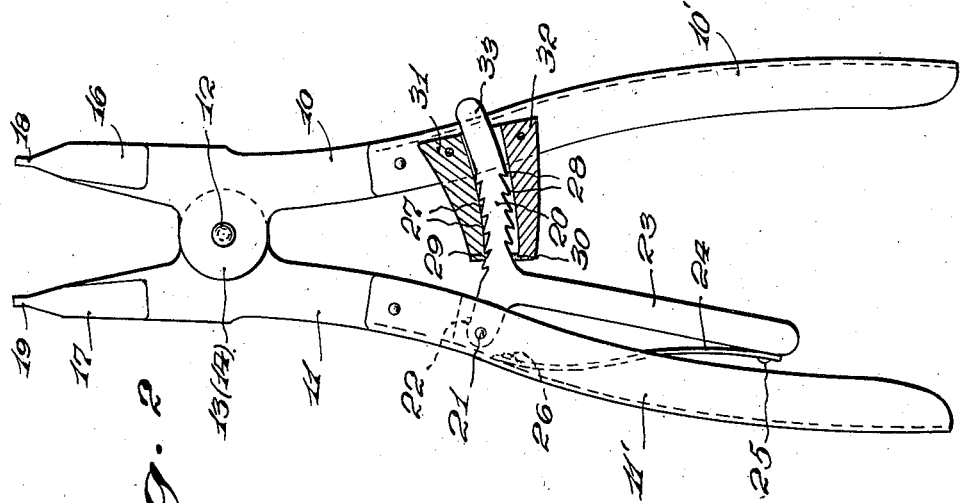
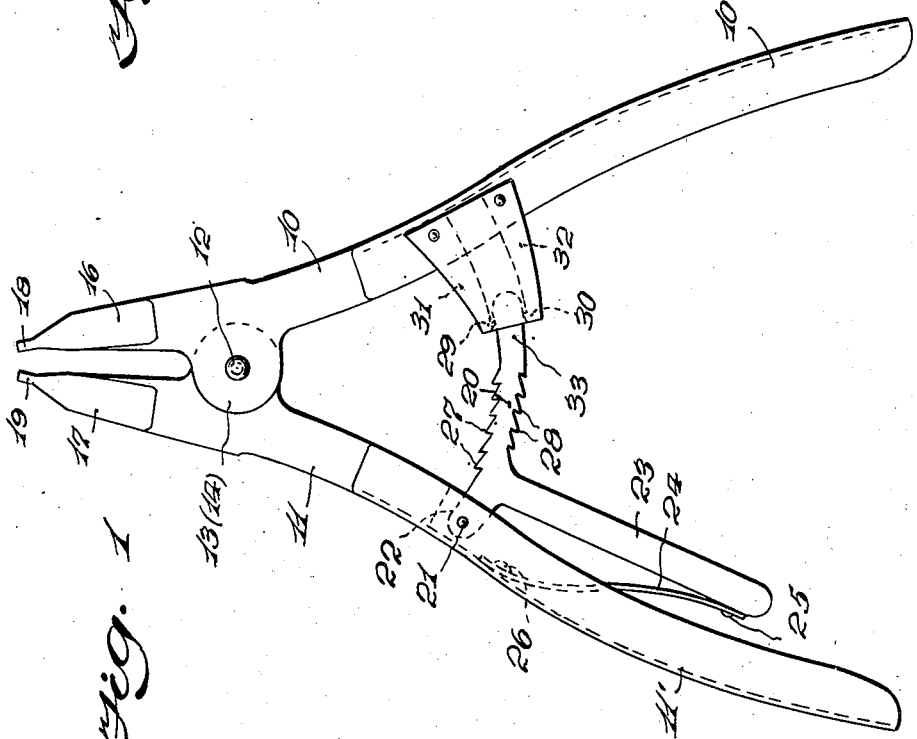
Inventors
Rudolf Feitl,
Hugo Wurzel,
By J. Harold Kieosges
Attorney

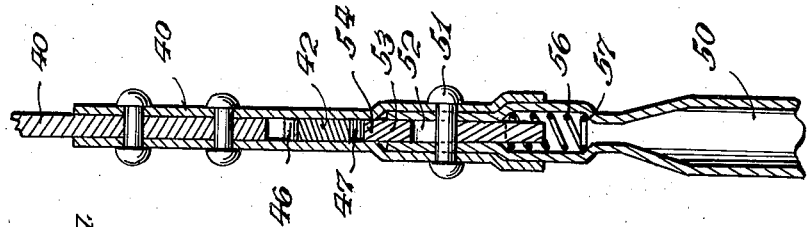
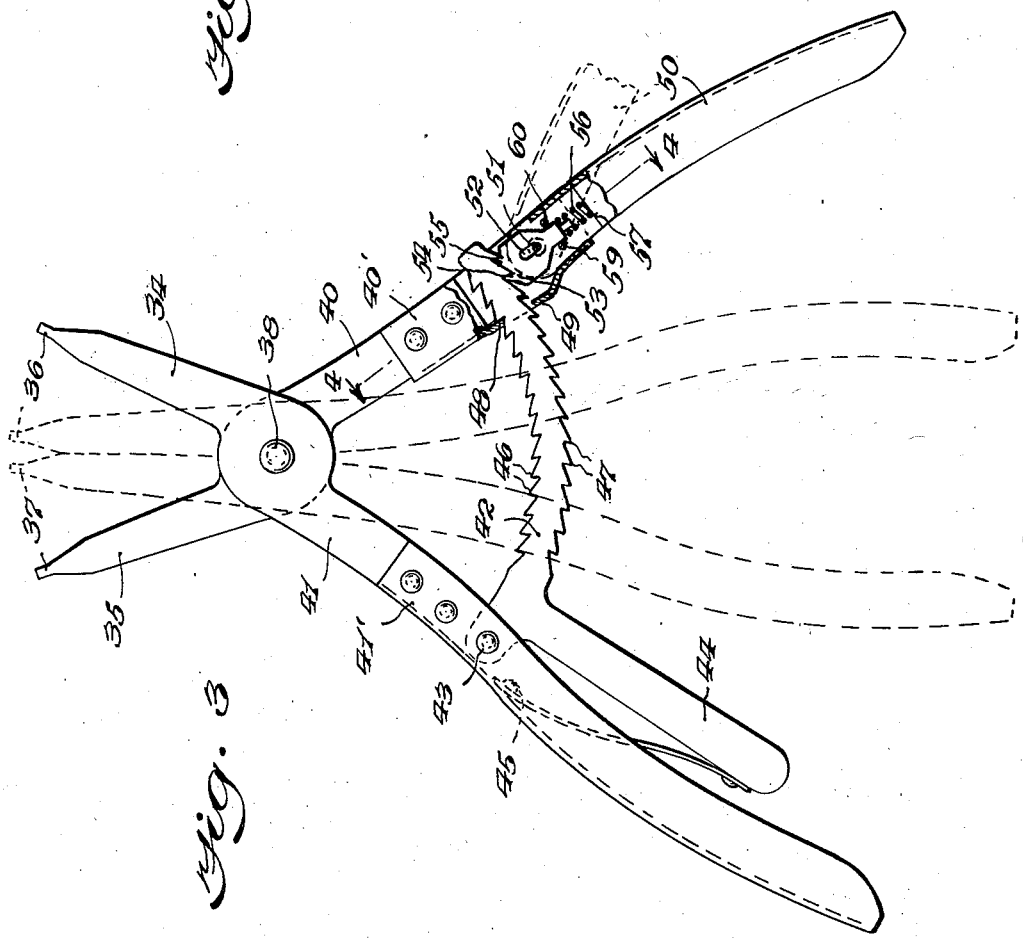

Patented Apr. 13, 1948

2,439,785

UNITED STATES PATENT OFFICE 2,439,785

TOOL FOR HANDLING OPEN-ENDED RETAINING RINGS

Rudolf Feitl, Brooklyn, and Hugo Wurzel, Bronx, N. Y., assignors to Waldes Koh-I-Noor, Inc., Long Island City, N. Y., a corporation of New York Application February 19, 1945, Serial No. 578,633

4 Claims. (Cl. 29—229)

1

This invention relates to improvements in tools for handling open-ended retaining rings which, upon being sprung into a shaft or housing groove, are adapted to form an artificial shoulder thereon for securing machine parts against relative axial displacement.

To assist in handling such rings it has been proposed, for example in Reissue Patent No. 18,144, to form the rings at their open ends with apertured ears with which the working points provided on plier-type handling tools are coupled for the purpose of spreading or compressing the rings, depending on whether the ring is of the external or internal type. However, the forces which are required to be exerted on the handles of such plier-type handling tools to spread an external ring sufficiently so that it can be slipped over and then shifted axially along the shaft to the plane of its seating groove, or to contract or compress an internal ring the required amount that it can be inserted into a housing bore and thereupon shifted to its groove, are remarkably high for the larger size rings and, in the case of ring sizes of six inches or greater, can amount to approximately 150 lbs. While the requisite spreading or contracting forces can be obtained by increasing the length of the plier handles, thus to obtain additional operating leverage, such provision does not relieve the operator of the requirement of holding the tool handles closed against the tension of the spread or contracted ring so that the handling of the ring as aforesaid represents a difficult and tiresome operation and one difficult to control. Moreover, as the ring is shifted into the plane of the groove in which it is to seat, it is necessary to release the force on the tool handles so that the ring can spring into its groove. In the absence of any means incorporated into prior ring handling tools for effecting the gradual release of the handles, such release usually takes place quite suddenly and results in impacting of the ring against the groove bottom, which is likely to damage the groove or the walls thereof, particularly if a ring of high hardness strikes against a groove provided in a shaft or housing of substantially softer material.

Accordingly, a principal object of the invention is to provide tools for handling open-ended retaining rings, having special provision for securing the handles against self-opening under the tension of the ring with which the tool is coupled, whereby the operator is relieved of the requirement of holding the tool handles closed by manually applied force. Another important object of the invention is to provide a tool of the stated

2 character which incorporates means effecting step-by-step release of the ring whereby its movement into the groove is gradual and can be controlled by the operator. A further object of the invention is to provide a tool for handling open-ended retaining rings incorporating means for positively closing the tool handles against the tension of a ring being contracted, for example, with a step-by-step motion whereby the operator is to a substantial extent relieved of the requirement for manually closing such handles. More specific objects of the invention are to provide a rugged and thoroughly dependable tool for handling open-ended retaining rings, particularly of the larger sizes, in their assembly and disassembly, which is moreover characterized by simple inexpensive construction, and which is capable of being readily and simply operated.

Other objects will be in part obvious and in part hereinafter pointed out in connection with the following analysis of this invention wherein are illustrated in detail selected embodiments of the invention.

In the drawings:

Fig. 1 is a face view of a tool according to the invention for spreading and handling external retaining rings, the tool handles being shown in their open position and the plier tips in their closed position as required for the insertion of the working points into the apertured ears formed on the ring to be spread upon closing movement of the handles;

Fig. 2 is a view similar to Fig. 1 but showing the tool handles in their closed position and the tool points in their spread position corresponding to the spread position of the ring with which such a tool is coupled;

Fig. 3 is a face view of a modified tool for contracting and handling internal rings, and further illustrating a means for effecting positive, step-by-step closing movement of the tool handles; and Fig. 4 is a section along lines 4—4 of Fig. 3.

Referring to the tool illustrated in Figs. 1 and 2 of the drawings, reference characters 10 and 11 designate a pair of levers, more particularly referred to as tool handles, which are pivotally connected by a pin 12 extending through semi-circular bosses 13, 14 formed on the handles, the latter terminating at their one end in plier tips 16 and 17. To the aforesaid tips are connected, for example by spot-welding, riveting or screwing on, the working points 18, 19 which are adapted to be inserted into the apertured ears usually formed at the open ends of an external ring to assist in their spreading and handling. Secured to the other ends of the levers or handles 10 and 11 are handle extensions 10', 11' which are preferably of channel or U-section and which may be sufficiently long as to provide adequate leverage for operating the handles against the tension of the relatively large-size retaining rings, for example.

According to the invention, a ratchet segment 20 is pivoted at its one end to one of the handle extensions 11' by a pin or rivet 21 spanning the sides of the U-formed handle, the segment being provided with an offset arm 23 which is engaged by a leaf spring 24 secured at one end to the arm as by a rivet 25, the other end of the spring abutting, as shown, against a pin 26 arranged within the U-bend of the handle extension 11'. Spring 24 functions through actuating arm 23 to urge the ratchet segment 20 in counter-clockwise direction (Figs. 1 and 2).

The ratchet segment along its relatively inner (upper) longitudinal edge is formed with a plurality of ratchet teeth 27 engageable by a cooperating pawl 29 carried by the other handle extension 10'. The relatively outer longitudinal edge of the ratchet segment is also provided with a plurality of ratchet teeth 28 which are disposed oppositely to the ratchet teeth 27 and are adapted to cooperate with a pawl 30 which is also carried by the handle 10' and is oppositely disposed relative to the pawl 29. Preferably, the oppositely disposed pawls 29, 30 are carried by arms 31, 32 arranged to provide a housing-like guide extension secured within the U-bend of the handle 10', and into which the free end of the ratchet segment is adapted to move as the handles are moved relatively towards one another. Moreover, the pawls 29, 30 are so spaced from each other that if the inner teeth 27 are caught by the pawl 29, the outer teeth 28 are just free of the pawl 30, and vice versa. Accordingly, one of the inner or outer teeth 27, 28 is always caught by one or the other of the pawls 29, 30. It will be observed also that spring 24 tends normally to maintain the ratchet segment in position so that its inner edge teeth 27 are engageable by the pawl 29.

With the construction so far described, it will appear that as the handle extensions 10', 11' are moved in closing direction, i. e. toward one another, ratchet segment 20 moves into the guide 31, 32, the inner teeth 27 thereof riding over the pawl 29 during such handle closing movement as permitted by the action of spring 24. However, in any in-between or in the fully closed position of the handles, the latter are secured against self-opening movement under the tension of the spread ring by the holding engagement of pawl 29 with one of the ratchet teeth 27. Accordingly, not only is the tool as described capable of self-locking itself against handle opening movement, following closing of the handle either to a fully closed position or to any in-between position, but also the closed tool and the ring coupled thereto can safely be held in one hand by the operator in shifting the same along a shaft, for example, to the plane of its seating groove. To release the ring, i. e. unlock the tool handles, it is only necessary to depress the actuating arm 23 against the action of spring 24, thereby to swing the ratchet arm in clockwise direction and accordingly to disengage the teeth 27 from pawl 29.

The above described arrangement also provides means for effecting step-by-step release of the locking means whereby the spread ring can be gradually and controllably sprung into its seating groove without impacting the bottom or side walls thereof. To this end, the inner and outer ratchet teeth 27, 28 are staggered or relatively spaced from each other in linear direction the distance of approximately one-half the pitch distance between teeth.

Thus, assuming the handles to be locked closed by engagement of pawl 29 with one of the inner ratchet teeth 27, the actuating arm 23 is depressed, whereupon the ratchet segment 20 is swung to a position that the teeth 28 may be engaged by the pawl 30. Due to the staggering of the oppositely arranged ratchet teeth, each operation of the actuating arm 23 results in release of the handles under the tension of the retaining ring a distance corresponding to half the pitch distance between ratchet teeth. Upon relieving hand pressure on the actuating arm 23, spring 24 functions to return the ratchet segment 20 to its normal position, whereupon the next of the inner teeth 27 is engaged by the pawl 29. Accordingly, for a full back and forth operation of the ratchet segment as described, the tool handles are controllably opened a distance corresponding to the full pitch distance between teeth. It follows that by successive operations of the actuating arm 23, as described, the handles may be released with a step-by-step motion, permitting accurate controlled seating of the retaining ring held by the tool points 18, 19 in its groove. It will be observed also that the step-by-step release of the handles can be effected with one hand, leaving the other hand free to hold or steady another part, such as the machine part, or the ring, in a required position.

By mounting the ratchet segment 20 and pawls 29 and 30 within the space between the handles, the length of the ratchet segment may be made relatively short, so that the free end of the segment does not project substantially beyond handle extension 10', even in the closed position of the handles and accordingly, the segment provides no interference in assembling the ring or in shifting the same into limited spaces as, for example, into a bore space disposed about the shaft on which the ring is to be assembled. It will be noted also that the free end of the ratchet segment 20 may be formed free of the ratchet teeth, because the force required in the first closing movement of the handles is not substantial, and hence there exists no requirement for self-locking the handles against self-opening in preliminarily tensioning the ring.

Referring to the modification illustrated in Figs. 3 and 4, the tool therein shown is of the type adapted to compress or contract internal rings which form artificial shoulders within a housing bore, for example. Said tool comprises crossed arms providing plier tips 34, 35 terminating in the working points 36, 37, the crossed arms being pivoted at 38 and forming handle shanks 40, 41. As shown, handle extensions 40', 41' of channel or U-section may be coupled to the handle shanks to provide necessary leverage for handling rings of the larger sizes.

As shown, the illustrated tool is provided with means for locking the handles against self-opening movement under the tension of a contracted internal ring, for example, as generally described in connection with the prior modification, such comprising a ratchet segment 42 pivoted as at 43 to the handle extension 41' and provided with an offset actuating arm 44 which is spring-tensioned by a leaf spring 45 in the manner of the previously described arm 23. The ratchet segment is provided along opposite edges with inner and outer ratchet teeth 46, 47, respectively, which are adapted to be engaged by one or the other of the oppositely disposed pawls 48, 49 formed by the opposed edges of an opening provided in the handle extension 40'. The teeth 46, 47 are relatively staggered a distance corresponding to half the pitch distance between teeth whereby, as the actuating arm 44 is depressed in clockwise direction, the ratchet segment is turned clockwise to bring the outer teeth 47 thereof into engagement with the pawl 49, with release of the handle returning the ratchet segment to the position in which teeth 46 are engaged by the pawl 48.

Accordingly, as the handles are moved in closing direction to contract a ring coupled on to the working points 36, 37 of the tool, the pawl and ratchet members 46, 48 function to lock the handles against self-opening movement under the tension of the contracted ring. In conjunction therewith, the provision of the pawl and ratchet members 47, 49 and the relative disposition of ratchet teeth 46, 47 permit step-by-step opening of the handles and gradual release of the retaining ring so that it may seat gently into the groove provided for its reception, all as described in connection with the prior modification.

According to a further feature of the invention, means are provided for positively closing the handles 40', 41' against the tension of the retaining ring being constracted with a step-by-step motion. As shown, such means comprises a pivoted handle portion 50 adapted to be raised and lowered relative to the handle extension 40' about the axis of a connecting pin 51. Retractible within the connected end of the pivoted handle portion is a driving head 53 provided with a plurality of teeth 54, 55 adapted to mesh with the outer ratchet teeth 47. The head 53 is normally urged to its relatively outward position by a spring 56 operative between the rear end of the head and the abutment 57 formed in the handle portion 50. Through the provision of a head slot 52 through which the pin 51 extends, the head may retract within the handle portion 50 a distance corresponding to the length of the slot. Pins 59, 60 engage against straight side wall portions of the head to prevent turning movement thereof independently of the handle portion 50.

In the normal or hand operation of the tool, the handle portion 50 is swung to its full line position illustrated in Fig. 3, being held against further movement past said full line position by its mounting as shown in the handle extension 40'. As the ratchet segment 42 is projected through the handle extension 40', consequent to movement of the handles in closing direction, the teeth 47 of the segment ride freely past the teeth 54, 55 of the driving head due to the ability of the head to retract within the handle portion 50. However, when it is desired to positively actuate or drive the handles in closing direction, the handle portion 50 is swung upwardly to its dotted line position, resulting in swinging of the head 53 downwardly to a position in alignment therewith. With spring 56 acting to urge the head outwardly of the handle portion 50, so that its teeth 54, 55 mesh with the ratchet teeth 47, downward movement of handle portion 50 to its full line position forces the ratchet segment through the handle the approximate distance between teeth 47. By successive operations of the handle portion 50 as aforesaid, the handles are progressively moved to a fully closed position or to any intermediate position desired for a particular assembly operation. During such positive closing movement pawl and ratchet members 46, 48 secure the handle against self-opening under the tension of the retaining ring which is being contracted in consequence of the step-by-step closing of the handles.

In addition to providing a simple means for effecting positive step-by-step closing of the handles, the above described arrangement provides one in which the closing force is reduced according to the ratio between the distance of ratchet segment 42 from pin 38, on the one hand, and the distance of the segment from pin 51, on the other hand. Accordingly the positive closing of the handles may be effected with little effort on the part of the operator.

Assuming the handles to be closed either by the normal or hand operation of the tool, or by the positive step-by-step closing operation as last described, controlled step-by-step opening of the handles is effected as with the Figs. 1 and 2 modification, since the retractible mounting of the driving head 53 permits said head to retract as the ratchet segment 42 is swung clockwise (Fig. 3) by depression of the actuating arm 44, thus permitting pawl 49 to act on the ratchet teeth 47 just as if the driving head were omitted.

Without further analysis it will be observed that ring handling tools provided with the self-locking attachment as proposed herein permit spreading or compressing of a ring in simple manner and thereupon provide for securing the handles against self-opening, with the end result that following the desired spreading or compressing of the ring the operator is under no requirement to hold the tool handles closed but, on the contrary, may shift the ring as necessary in assembly or disassembly by holding the tool with one hand. This leaves the other hand free either for operation of the release handles 23, 44, or for steadying or positioning other parts involved in the assembly of the ring. In the use of the driving attachment as shown in Fig. 3, one tool handle may be held by one hand of the operator and the driving handle portion 50 may be actuated by the other hand of the operator. Thereupon, the tool and contracted ring may be safely held with one hand during the required handling of the ring.

As many changes could be made in carrying out the above constructions without departing from the scope of the invention, it is intended that all matter contained in the above description or shown in the accompanying drawings shall be interpreted as illustrative and not in a limited sense.

We claim:

1. A plier-type tool of the character described comprising a pair of levers and means pivotally connecting said levers together intermediate their ends, the ends of the levers to one side of the pivot means constituting plier tips terminating in working points and the other ends constituting handles which are adapted to be brought together upon coupling of the working points with a work piece, and means for locking said handles against self-spreading and for allowing controlled spreading of the handles including an elongated ratchet member pivotally connected to one handle and extending between said handles, the opposite longitudinal edges of said ratchet member each having a series of ratchet teeth, the teeth of one edge series being staggered relative to the teeth of the other edge series, oppositely disposed pawls affixed to the other handle, said pawls being spaced from one another so that one or the other edge series of teeth are always engageable by one or the other pawl, means normally operative to maintain the ratchet member in a position wherein the teeth of one edge series thereof are engageable by one of said pawls, and means for swinging the ratchet member in opposite direction, thereby to effect release of an engaged tooth, and simultaneously to a position wherein the teeth of the other edge series are engageable by the other pawl.

2. A plier-type tool of the character described comprising a pair of levers and means pivotally connecting said levers together intermediate their ends, the ends of the levers to one side of the pivot means constituting plier tips terminating in working points and the other ends constituting handles which are adapted to be brought together upon coupling of the working points with a work piece, and means for locking said handles against self-spreading and for allowing controlled spreading of the handles including an elongated ratchet member pivotally connected to one handle and extending between said handles, the opposite longitudinal edges of said ratchet member each having a series of ratchet teeth, the teeth of one edge series being staggered relative to the teeth of the other edge series, oppositely disposed pawls and means mounting them on the other handle in fixed relation and spaced so that one or the other edge series of teeth are always engageable by one or the other pawl, spring means normally urging said ratchet member to a position wherein the teeth of one edge series thereof are engageable by one of said pawls, and an actuating arm carried by the ratchet member for actuating the same out of said position, thereby to effect release of an engaged tooth, and simultaneously to a position wherein the teeth of the other edge series are engageable by the other pawl.

3. A plier-type tool as set forth in claim 1, in combination with means for effecting positive step-by-step closing movement of the handles including a pivoted end section on the other handle, a retractible driving head carried by said end section having teeth normally disposed in meshing engagement with the teeth of one edge series thereof, and means mounting said end section and driving head for swinging movement in unison thereby to ratchet said other handle along the ratchet member and in the direction of said one handle.

4. A plier-type tool as set forth in claim 2, in combination with means for effecting positive step-by-step closing movement of the handles including a pivoted end section on the other handle, a retractible driving head carried by said end section having teeth normally disposed in meshing engagement with the teeth of one edge series thereof, and means mounting said end section and driving head for swinging movement in unison thereby to ratchet said other handle along the ratchet member and in the direction of said one handle.

RUDOLF FEITL.
HUGO WURZEL.

REFERENCES CITED

The following references are of record in the file of this patent:

UNITED STATES PATENTS

| Number | Name | Date |
|---|---|---|
| 1,266,788 | Gannaway | May 21, 1918 |
| 1,461,346 | Clerico | July 10, 1923 |
| 1,501,417 | Manna | July 15, 1924 |
| 1,607,154 | Feather | Nov. 16, 1926 |
| 1,608,883 | Justus | Nov. 30, 1926 |
| 1,616,621 | Hooks | Feb. 8, 1927 |
| 1,651,998 | Clerico | Dec. 6, 1927 |
| 1,746,016 | Shiffman et al. | Feb. 4, 1930 |
| 1,772,428 | Palotce | Aug. 5, 1930 |
| 1,978,543 | Maderia | Oct. 30, 1934 |